United States Patent Office 3,444,096
Patented May 13, 1969

3,444,096
CATALYST PREPARATION
Leonard Turner, Woking, and Brian Patrick McGrath, Crowthorne, England, assignors to The British Petroleum Company Limited, London, England, a corporation of England
No Drawing. Filed Aug. 26, 1965, Ser. No. 482,933
Claims priority, application Great Britain, Sept. 23, 1964, 38,758/64
Int. Cl. B01j *11/78*
U.S. Cl. 252—442                                     8 Claims

ABSTRACT OF THE DISCLOSURE

A hydrocarbon conversion catalyst is prepared by fluorinating alumina which has been pretreated with water or water vapor. A fluoride of carbon or sulphur and particularly carbon tetrafluoride may be used at 300–350° C. The catalyst contains 0.5 to 1.5% fluorine.

---

This invention relates to the preparation of catalysts suitable for hydrocarbon conversion and comprising a halogentable inorganic oxide and fluorine. In particular the invention relates to the preparation of catalysts suitable for the skeletal isomerisation of olefins.

Catalysts comprising alumina and fluorine are well known and have been proposed for use in a number of hydrocarbon conversion reactions. In preparing these catalysts, fluorine may be added in a variety of ways, for example by treating the alumina with hydrogen fluoride, fluorine gas or other fluorine-containing compounds. It has recently been proposed to fluorinate the alumina by treatment at elevated temperature with the vapour of a fluorine compound of formula $Y_2XF_2$, where Y is fluorine or hydrogen and X is carbon or sulphur.

For some purposes it is desirable to use fluorinated alumina catalysts having a low proportion of fluorine i.e., in the range 0.5 to 1.5% by weight. For example, in our copending British patent application No. 37,783/64 a process is described for the interconversion of butenes using a fluorinated alumina catalyst containing 0.5 to 1.5% by weight of fluorine, the alumina having a reversible benzene adsorption as defined of at least 2 micromols per gm. of alumina. It has however been found that when preparing fluorinated alumina catalysts by treatment of the alumina with a fluorine compound of formula $Y_2XF_2$, whilst the alumina may be readily fluorinated at 400 to 450° C, the fluorination is fast and difficult to control. If the temperature is lowered to 200 to 350° C., the fluorination is slowed down and more control may be exercised. However, if it is desired to prepare a catalyst containing a low proportion of fluorine e.g., 0.5 to 1.5% weight, under ostensibly identical fluorinating conditions the amount of fluorine retained by the alumina varies in a surprisingly erratic manner.

It has now been found by subjecting the alumina to a certain pretreatment before fluorination, it is possible to prepare catalysts containing 0.5 to 1.5% weight fluorine in a reproducible manner. A further advantage gained by preparing the catalysts by the process of the present invention is that not only is the degree of fluorination reproducible, but fluorination is considerably faster than that experienced when fluorinating untreated oxides.

Accordingly the present invention provides a process for the preparation of hydrocarbon conversion catalyst comprising alumina and fluorine, which process comprises contacting the alumina at room temperature with liquid water or water vapor, partially dehydrating the treated alumina and fluorinating by contact at a temperature in the range 200° to 350° C. with a vapour of a fluorine compound of formula $Y_2XF_2$, where X is carbon or sulphur and Y is fluorine or hydrogen, for such time that the fluorinated alumina contains from 0.5 to 1.5% weight fluorine.

It will be understood that the water treated alumina may be partially dehydrated before fluorination, or dehydration may be effected during fluorination. Dehydration may also be effected both before and during fluorination.

The process of the present invention is particularly useful in preparing in a reproducible controlled manner, catalysts containing 0.7 to 1.4% weight fluorine, which catalysts may be used in the interconversion of n-butenes and isobutene, as described in our copending British patent application No. 37,783/64.

The alumina may be treated with water vapour in a variety of ways. One method is to stand the alumina in a closed vessel for a period of time which may be 24 hours or more, in an atmosphere saturated with water vapour. The amount of water vapour taken up by the alumina will vary with the particular alumina, the exact amount being of little significance.

Partial dehydration of the treated alumina may be effected in a variety of ways, e.g., by passing a stream of nitrogen gas over the alumina at a temperature of about 450° C. for ½ to 2 hours. It is not necessary thoroughly to dehydrate the alumina during the above treatment, dehydrated oxides of varying water contents apparently fluorinating to substantially the same degree under fixed fluorinating conditions. Generally the treated alumina is dehydrated to a water content of about 3% by weight.

The fluorine-containing compounds used to fluorinate the alumina are those of formula $Y_2XF_2$, where X is carbon or sulphur and Y is fluorine or hydrogen. Compounds within the general formula are carbon tetrafluoride, fluoroform, methylene fluoride, and the corresponding sulphur compounds, carbon tetrafluoride being preferred. Carbon tetrafluoride is an extremely stable compound and is not, prima facie, an obvious choice for preparing fluorine-containing catalysts. Nevertheless it has been found suitable and has advantages over other fluorinating compounds. As compared with hydrogen fluoride, for example, it is non-corrosive, easier to handle, readily utilisable in the vapour phase and less liable to damage the oxide. As compared with alkyl fluorides containing a higher number of carbon atoms, for example tertiary butyl fluoride, it is less likely to produce carbonaceous or hydrocarbonaceous deposits on the catalyst during fluorination.

Preferably the contacting of the alumina with the fluorine compound is carried out under non-reducing conditions. A convenient method of contacting is to pass a stream of the vapour over the oxide either alone or in admixture with an inert gas, for example nitrogen, or in admixture with an oxygen-containing gas, for example air. The temperature and duration of fluorination affect the amount of fluorine taken up by the catalyst, increase in either of these increasing the amount taken up. Temperatures are in the range 200° to 350° C. and the contact times may be from 0.1 to 5 hours.

The invention includes catalysts when prepared by the process described above.

The invention is illustrated by the following example.
Experiment A: A sample of an alumina was heated at 450° C. in a stream of carbon tetrafluoride passed at a GHSV of 300 v./v. for 2 minutes. The product contained 2.07 weight fluorine even after this short time, thereby illustrating that at this tempearture fluorination is fast and control of the fluorine content of the finished catalyst is difficult.

Experiment B: A number of samples of the same alumina as used in Experiment A were heated in a stream of dry nitrogen gas passed at a GHSV of 500 v./v. at 450° C. for 1 hour. A mixture of carbon tetrafluoride at a GHSV of 500 v./v. and nitrogen gas at a GHSV of 500 v./v. was then passed over the dried alumina samples for 1 hour at 300° C. and in successive runs the products were found to contain 0.96, 0.32, 0.34, 0.80, 0.43, 0.37, 0.29 and 0.45% weight fluorine. This experiment demonstrates that the amount of fluorine put onto the alumina at 300° C. in 1 hour, may vary in a surprisingly erratic manner, even when an attempt to standardise the aluminas by pre-drying is made.

Experiment C: This experiment illustrates the process of the invention. A sample of the same alumina as used in Experiment A was heated to 450° C. for 1 hour in nitrogen at a GHSV of 500 v./v. The alumina then contained 6.4 percent by weight of water. A sample of this alumina was allowed to stand in a closed vessel the atmosphere of which was saturated with water vapour at 20° C. Samples were withdrawn at different times over a period of days and these were then heated in a stream of dry nitrogen at a GHSV of 500 v./v. at 450° C. for 1 hour. The dried samples containing from 3 to 3.1 percent by weight of water were then treated at 300° C. with a mixture of carbon tetrafluoride at a GHSV of 500 v./v. and nitrogen gas at a GHSV v./v. for varying periods. The following figures illustrate the controlled fluorination of the water treated material.

| Time of fluorination, min: | Percent F in product, wt. |
|---|---|
| 23 | 0.77 |
| 30 | 0.89 |
| 60 | 1.28 |
| 60 | 1.27 |
| 60 | 1.24 |

The three 60 minute runs illustrate the reproducibility of fluorination. This experiment also shows that water treated aluminas are readily and reproducibly fluorinated.

Experiment D: This experiment shows that water treatment prior to dehydration is essential to cause the alumina to be readily and reproducibly fluorinated.

When alumina from Experiment A was treated for 1 hour with nitrogen at a GHSV of 500 at 450° C. the water content was reduced from 9.9 to 6.4 percent by weight. Further heating at 450° C. for 4 hours in air reduced the water content to 3.3 percent by weight which corresponds to the water contents of the aluminas for fluorination in Experiment C. When this alumina was treated with a mixture of carbon tetrafluoride at a GHSV of 500 v./v. and nitrogen at a GHSV of 500 v./v. for one hour at 300° C. the product contained only 0.54 percent weight fluorine; of 1.24–1.28 percent F in the water-treated aluminas of Example C.

Experiment E: A sample of the same alumina as used in Experiment A was dried in air at 450° C. for 4 hours and fluorinated with a mixture of carbon tetrafluoride at a GHSV of 500 v./v. and nitrogen gas at a GHSV of 500 v./v at 300° C. for varying periods.

| Time of fluorination, hrs.: | Percent F in product, wt. |
|---|---|
| 1 | 0.42 |
| 2 | 0.69 |
| 4.65 | 0.88 |

This illustrates, by comparison with Experiment C, the slowness of fluorination of the untreated alumina compared with that of the water-treated alumina. In Experiment C, an alumina having 0.89% weight fluorine is prepared in 30 minutes, whereas in Experiment E, with an alumina untreated with water, fluorination to 0.88% weight fluorine takes 4.75 hours.

We claim:

1. A process for the preparation of a hydrocarbon conversion catalyst comprising alumina and fluorine, which process comprises contacting the alumina at room temperature wtih liquid water or water vapour, partially dehydrating the treated alumina and fluorinating by contact at a temperature in the range 300°–350° C. with a vapour of a fluorine compound of formula $Y_2XF_2$ where X is carbon or sulphur and Y is fluorine or hydrogen, for such time that the fluorinated alumina contains from 0.5 to 1.5% by weight fluorine.

2. A process according to claim 1 wherein the alumina is contacted with water vapour by standing a closed vessel in an atmosphere saturated with water vapour for a period of time not less than 24 hours.

3. A process according to either of the preceding claims wherein partial dehydration of the treated alumina is effected by passing a stream of inert gas over the alumina at a temperature of about 450° C. for ½ to 2 hours.

4. A process according to claim 3 wherein the treated alumina is dehydrated to a water content of about 3% by weight.

5. A process according to claim 1 wherein the fluorine containing compound of formula $Y_2XF_2$ where X and Y are as hereinbefore defined is carbon tetrafluoride.

6. A process according to claim 5 where the alumina is contacted with the fluorine containing compound under nonreducing conditions.

7. A process according to claim 1 wherein fluorination is effected at a temperature in range 200°–350° C.

8. A process according to claim 7 wherein the contact time of fluorination is in the range 0.1–5 hours.

References Cited

UNITED STATES PATENTS

| 2,381,562 | 8/1945 | Stewart | 252—442 X |
| 2,848,380 | 8/1958 | Thomas | 252—442 X |
| 3,138,559 | 6/1964 | Hauptschein | 252—442 |
| 3,248,449 | 4/1966 | Goble | 252—442 X |

DANIEL E. WYMAN, *Primary Examiner.*

C. F. DEES, *Assistant Examiner.*

U.S. Cl. X.R.

252—439

UNITED STATES PATENT OFFICE
CERTIFICATE OF CORRECTION

Patent No. 3,444,096            May 13, 1969

Leonard Turner et al.

It is certified that error appears in the above identified patent and that said Letters Patent are hereby corrected as shown below:

Column 1, line 25, "halogentable" should read -- halogenatable --. Column 2, line 68, "2.07" should read -- 2.07% --. Column 3, line 27, "GHSV v/v" should read -- GHSV of 500 v/v --.

Signed and sealed this 21st day of April 1970.

(SEAL)
Attest:

Edward M. Fletcher, Jr.           WILLIAM E. SCHUYLER, JR.
Attesting Officer                Commissioner of Patents